(12) United States Patent
Leininger et al.

(10) Patent No.: US 11,228,164 B2
(45) Date of Patent: *Jan. 18, 2022

(54) CABLE BEARING ELEMENT, ARRANGEMENT OF CABLE BEARING ELEMENTS AND METHOD OF MANUFACTURING A CABLE BEARING ELEMENT

(71) Applicant: Bombardier Transportation GmbH, Berlin (DE)

(72) Inventors: Tobias Leininger, Mannheim (DE); Federico Garcia, Rheinhausen (DE); Anton Geiger, Mannheim (DE); Oliver Kerle, Wiesloch (DE); Nestor Martinez Pelaez, Mannheim (DE); Johannes Schütz, Birkenau (DE); Ping Wei, Mannheim (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,243

(22) Filed: Aug. 21, 2020

(65) Prior Publication Data
US 2020/0381906 A1 Dec. 3, 2020

Related U.S. Application Data

(63) Continuation of application No. 14/437,620, filed as application No. PCT/EP2013/073212 on Nov. 7, 2013, now Pat. No. 10,804,684.

(30) Foreign Application Priority Data

Nov. 7, 2012 (GB) .................................. 1220050

(51) Int. Cl.
*H02G 3/04* (2006.01)
*F16L 3/26* (2006.01)

(52) U.S. Cl.
CPC .............. *H02G 3/0437* (2013.01); *F16L 3/26* (2013.01)

(58) Field of Classification Search
CPC ...... H02G 3/04; H02G 3/0406; H02G 3/0418; H02G 3/0437; H02G 3/0443; H02G 3/045;
(Continued)

(56) References Cited

U.S. PATENT DOCUMENTS 2,351,379 A 6/1944 Wehringer
2,834,622 A 5/1958 Reeves
(Continued)

FOREIGN PATENT DOCUMENTS

CN 102083649 A 6/2011
FR 2425759 A1 12/1979
(Continued)

*Primary Examiner* — Jonathan Liu
*Assistant Examiner* — Guang H Guan
(74) *Attorney, Agent, or Firm* — The Webb Law Firm

(57) ABSTRACT

Disclosed are a cable bearing element, an arrangement of cable bearing elements and a method of manufacturing a cable bearing element. The cable bearing element is adapted to position and/or to hold at least one line section of an electric line by providing at least one guiding channel for the section of the electric line. A base of a first section of the guiding channel is arranged within a first plane and a base of another section of the guiding channel is arranged within a second plane, wherein the second plane is parallel to the first plane and spaced apart from the first plane with a first predetermined distance. The guiding channel has a base part and side walls, wherein a geometry or size of the guiding
(Continued)

channel is adapted to the diameter of the electric line or cable which is to be arranged within the guiding channel.

12 Claims, 6 Drawing Sheets

(58) Field of Classification Search
CPC .......... F16L 3/26; B60L 5/005; A63H 18/028; A63H 18/04
USPC .... 248/49, 51, 58, 65, 68.1, 346.01, 346.03; 174/68.3, 72 A; 439/501
See application file for complete search history.

(56) References Cited

U.S. PATENT DOCUMENTS

| | | | |
|---|---|---|---|
| 3,351,699 A | 11/1967 | Merckle | |
| 3,562,950 A | 2/1971 | Genin | |
| 3,858,875 A | 1/1975 | Nemeth et al. | |
| 4,131,811 A | 12/1978 | Apsit et al. | |
| 4,232,845 A | 11/1980 | Turner | |
| 4,303,017 A | 12/1981 | Diill | |
| 4,861,134 A | 8/1989 | Alameel et al. | |
| 4,900,121 A | 2/1990 | Becker et al. | |
| 4,955,405 A | 9/1990 | Glick et al. | |
| 5,023,404 A | 6/1991 | Hudson et al. | |
| 5,089,667 A | 2/1992 | Goussin et al. | |
| 5,142,606 A | 8/1992 | Carney et al. | |
| 5,399,812 A | 3/1995 | Woszczyna et al. | |
| 5,469,526 A | 11/1995 | Rawlings | |
| 6,076,659 A | 6/2000 | Baumgartner et al. | |
| 6,257,133 B1 | 7/2001 | Anderson | |
| 6,386,538 B1 | 5/2002 | Mejia | |
| 6,389,211 B1 | 5/2002 | Mandry et al. | |
| 6,425,468 B1 | 7/2002 | Yamamoto et al. | |
| 6,498,296 B2 | 12/2002 | Benito-Navazo | |
| 6,563,877 B1 | 5/2003 | Abbaszadeh | |
| 7,038,133 B2 | 5/2006 | Arai et al. | |
| 7,677,920 B2 | 3/2010 | Huang et al. | |
| 7,891,485 B2 | 2/2011 | Prescott | |
| 7,936,960 B2 | 5/2011 | McGranahan | |
| 9,067,496 B2 | 6/2015 | Czainski et al. | |
| 9,519,117 B2 | 12/2016 | Macall | |
| 9,745,703 B2 | 8/2017 | Curran et al. | |
| 10,514,112 B2 | 12/2019 | Leininger et al. | |
| 10,804,684 B2 * | 10/2020 | Leininger | F16L 3/26 |
| 2008/0142260 A1 | 6/2008 | Yamaguchi | |
| 2010/0248586 A1 | 9/2010 | Cochella | |
| 2011/0198176 A1 | 8/2011 | Meins et al. | |
| 2015/0300534 A1 | 10/2015 | Leininger et al. | |
| 2018/0363806 A1 | 12/2018 | Leininger et al. | |
| 2020/0381906 A1 * | 12/2020 | Leininger | H02G 3/0437 |

FOREIGN PATENT DOCUMENTS

| | | |
|---|---|---|
| GB | 1418128 | 12/1977 |
| GB | 2496187 A | 5/2013 |
| KR | 20110041937 A | 4/2011 |
| KR | 101237841 B1 | 2/2013 |
| SU | 452526 A1 | 12/1974 |
| WO | 2010031596 A2 | 3/2010 |
| WO | 2012026782 A2 | 3/2012 |
| WO | 2012157660 A1 | 11/2012 |

* cited by examiner

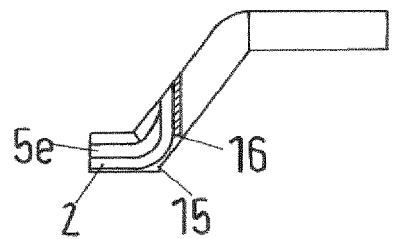
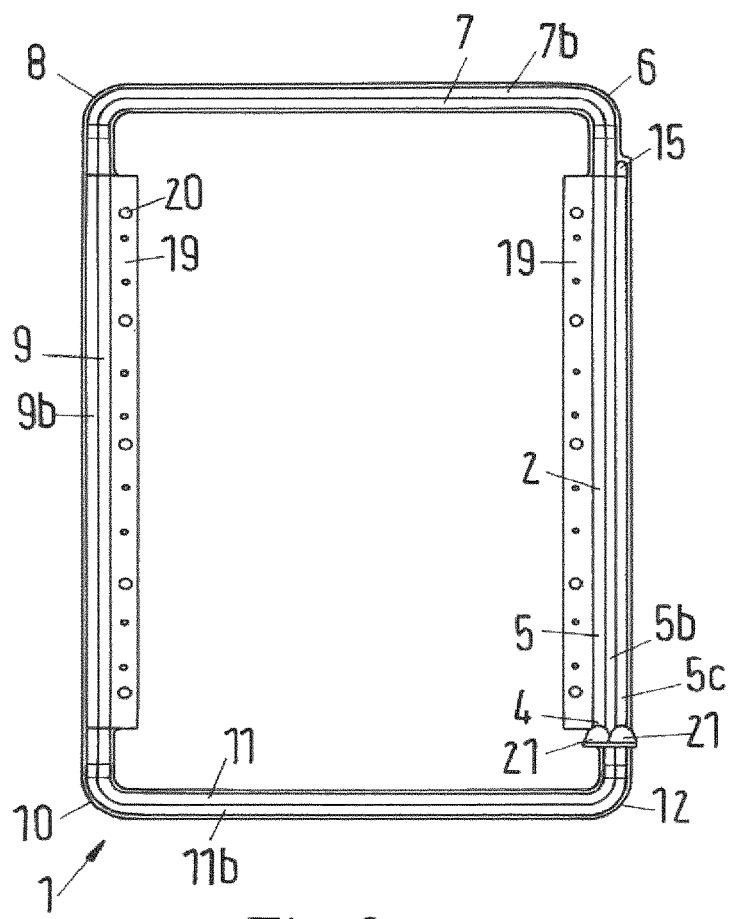

CABLE BEARING ELEMENT, ARRANGEMENT OF CABLE BEARING ELEMENTS AND METHOD OF MANUFACTURING A CABLE BEARING ELEMENT

CROSS-REFERENCE TO RELATED APPLICATIONS

This application is a continuation application of U.S. application Ser. No. 14/437,620, filed Apr. 22, 2015, which is the United States national phase of International Application No. PCT/EP2013/073212 filed Nov. 7, 2013, and claims priority to United Kingdom Patent Application No. 1220050.7 filed Nov. 7, 2012, the disclosures of which are hereby incorporated in their entirety by reference.

BACKGROUND OF THE INVENTION

Field of the Invention

The invention relates to a cable bearing element adapted to position and/or to hold at least one line section of an electric line, in particular an electric line of a vehicle-sided conductor arrangement for receiving an electromagnetic field and for producing an alternating current output voltage during an inductive power transfer to a vehicle. Furthermore, the invention relates to an arrangement of multiple cable bearing elements and a method of manufacturing a cable bearing element.

Description of Related Art

While travelling on a route, a vehicle requires energy for driving (i.e. propulsion) for auxiliary equipment which does not produce propulsion of the vehicle. Such auxiliary equipment includes, for example, lighting systems, heating and/or air conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either withdrawn from an on-board energy storage or can be received by induction from an arrangement of electric lines of the route.

The transfer of electric energy to the vehicle by induction forms a background of the invention. A route-sided conductor arrangement (primary side) produces an electromagnetic field. The field is received by a vehicle-sided conductor arrangement (secondary side), e.g. a coil, on board of the vehicle so that the field produces an electric voltage by induction. The transferred energy may be used for propulsion of the vehicle and/or for other purposes such as providing the auxiliary equipment of the vehicle with energy. The vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

The focus of the present invention is to continuously transfer energy to the vehicle while it travels or stands on the route. WO 2010/031596 A2 discloses a shaped block for positioning and/or holding a plurality of line sections of one or more electric lines along a driving way of a vehicle, wherein the shaped block has a plurality of recesses and/or projections, wherein the edges of a recesses and/or projections for the line sections in each case form a boundary of a space into which one of the line sections can be brought, so that it extends in a longitudinal direction of the space, and wherein the longitudinal directions of the spaces, delimited by the edges of the recesses and/or by the projections, extend essentially parallel to one another in a common plane.

If an alternating electric current flows through the electric lines, an electromagnetic field is produced that induces an electric current in a receiver of a vehicle which is travelling on the driving way. The shaped blocks facilitate the laying of electric lines in the driving way.

WO 2010/031596 A2 discloses ways of integrating the shaped block in railways for rail vehicles. For example, the shaped blocks are placed in between the rails, the electric lines are laid into the spaces defined by the blocks and the blocks are covered by lids.

In GB 119152.5, filed with the UKIPO on 4 Nov. 2011, an arrangement for providing a vehicle with electric energy is proposed, wherein the arrangement comprises a receiving device adapted to receive an alternating electromagnetic field and to produce an alternating electric current by magnetic induction, wherein the receiving device comprises a plurality of phase lines, each phase line being adapted to carry a different one of a plurality of phase currents of the alternating electric current. Each phase line forms at least three coils, wherein each coil consists of at least one turn of the phase line. If any one of the coils consists of one turn, the turn is turning around the central axis of the coil. If any one of the coils consists of more than one turn, the turns are consecutive sections of the phase line turning around the central axis of the coil. Furthermore, the at least three coils of each phase line are located next to each other so as to form a sequence of coils which covers an effective area in a plane that extends perpendicularly to the central axis of the coils, so that there are a first and a second end coil at the opposite ends of the sequence and at least one middle coil in between the end coils of the sequence. For at least one of the phase lines, each of the end coils consists of a smaller number of turns than the middle coil or middle coils.

It is an object of the present invention to provide a cable bearing element adapted to position and/or to hold at least one line section of an electric line, in particular an electric line forming a phase line of a receiving device of a vehicle which is adapted to receive an alternating electromagnetic field and to produce an alternating electric current by magnetic induction, wherein the cable bearing element provides an improved mechanical stability for windings of the electric line, reduces a time of assembly of a vehicle-sided conductor arrangement and provides a desired winding structure. Furthermore, it is an object of the invention to provide an arrangement of multiple cable bearing elements and a method of manufacturing such a cable bearing element.

SUMMARY OF THE INVENTION

It is a basic concept of the invention to provide a two-level cable bearing element which can also be referred to as winding housing. With respect to an arrangement of the proposed cable bearing element within a receiving device of a vehicle, sections of the cable bearing element extending in a longitudinal direction are arranged at a different height level than sections extending in a lateral direction. The longitudinal direction is equal or parallel to a direction of travel of the vehicle while the vehicle travels straight-ahead.

A cable bearing element adapted to position and/or to hold at least one line section of an electric line is proposed. The electric line can be a phase line of a receiving device of a vehicle adapted to receive an alternating electromagnetic field and to produce an alternating electric current by magnetic induction. In particular, the cable bearing element can be designed such that the electric line forms a desired vehicle-sided winding structure, e.g. predetermined number of coils, e.g. three coils, wherein each coil consists of at least one complete turn of the phase line. The receiving device can comprise the winding structure of electrically conducting material.

The present invention can be applied to any land vehicle, in particular track-bound vehicles, such as rail vehicles (e.g. trams), but also to road automobiles, such as individual (private) passenger cars or public transport vehicles, e.g. buses. Preferably, a primary-sided conductor arrangement which produces the alternating electromagnetic field is integrated in a track or a road of the vehicle so that the electric lines of the primary side conductor arrangement extend in a plane which is nearly parallel to the surface of the road or track on which the vehicle may travel. The receiving device to receive said electromagnetic field can be arranged at a bottom side of the vehicle.

The cable bearing element provides at least one guiding channel for the section of the electric line. The guiding channel can be a U-shaped or rectangular-shaped guiding channel which is open to the top. The guiding channel comprises a base part and side walls, wherein a geometry or size of the guiding channel is adapted to the diameter of the electric line or cable which is to be arranged within the guiding channel. The guiding channel provides a guiding means for guiding a course of the electric line such that a desired winding structure is provided.

For example, the geometry or size of the guiding channel can be chosen such that a diameter of the guiding channel is equal to the diameter of the electric line or cable which is to be arranged within the guiding channel. Also, the geometry or size of the guiding channel can be chosen such that the diameter of the guiding channel differs from the diameter of the electric line or cable which is to be arranged within the guiding channel by a predetermined, in particular small, amount, e.g. by a predetermined percentage, e.g. by 90% to 110%. Also, the geometry or size of the guiding channel can be chosen such that position of the electric line or cable which is to be arranged within the guiding channel can be secured. In particular, the geometry or size of the guiding channel can be chosen such that the electric line or cable can be fixed or clamped within the guiding channel.

In particular, the geometry or size of the guiding channel can be adapted to the diameter of a single electric line or a single cable which is to be arranged within the guiding channel.

A base of a first section of the guiding channel is arranged or extends within a first plane. The base can denote the lowest point of the guiding channel or the lowest surface of the guiding channel. A base of another section of the guiding channel is arranged or extends within a second plane, wherein the second plane is parallel to the first plane and spaced apart from the first plane with a first predetermined distance. This means that centre lines of the first section of the guiding channel and the other section of the guiding channel which extend along the bases of the first and the other section are arranged within parallel planes which are spaced apart with the first predetermined distance. The first section of the guiding channel can have a predetermined length. Accordingly, the other section of the guiding channel can have a predetermined length.

An electric line placed or arranged in the guiding channel will extend at two different height levels, wherein a height level is defined with respect to a vertical direction which is perpendicular to the first and the second plane. The guiding channel and the cable bearing element can be designed such that a desired electrical course or path of the electric line is formed and a specific inductance is achieved by the electric line placed in the guiding channel. The guiding channel provides a housing for windings of the electric line or cable which can be easily arranged within the cable bearing element in order to provide a desired winding structure. This can be especially useful for so called flat windings. Having two different height levels within the course of the electric line placed within the guiding channel of the cable bearing element advantageously allows stacking multiple cable bearing elements together, which will be explained later. Alternatively, a magnetic guiding element for guiding a magnetic flux can be arranged between the first and the second plane, e.g. a ferrite element. This advantageously allows guiding a magnetic flux during inductive power transfer in a desired way.

Furthermore, a fixed mechanical position for the electric line is provided by the proposed cable bearing element. If the electric line is part of a winding, e.g. a secondary winding of a transformer for inductive power transfer, the electric line must remain in a precise position so that the magnetic system does not vary in its physical behaviour. As winding structures formed by one or more electric line(s) normally lack of a stable mechanical structure, especially when the winding structure has a complex mechanical shape, the proposed cable bearing element or housing allows providing a mechanical stability and precise positioning of the electric line, which in turn, provides a robust transmission behaviour of the inductive power transfer. With the use of said cable bearing element, a specific shape of winding or winding structure can be achieved.

According to the invention, the guiding channel provides at least one complete turn. The base or base line of the guiding channel at an end of the first turn of the guiding channel is arranged within the same plane as the base of the guiding channel at a beginning of the first turn of the guiding channel, wherein a centre line or base line of the guiding channel at the end of the first turn of the guiding channel and a centre line or base line of the guiding channel at the beginning of the first turn of the guiding channel extend parallel to each other and are spaced apart with a predetermined distance. A turn is provided by consecutive sections of the electric line turning around a central axis of the cable bearing element. A complete turn provides a 360° turn of an electric line placed in the guiding channel.

In particular, a guiding channel providing one turn comprises at least a first section, wherein the base of the first section is arranged within the first plane. Furthermore, the guiding channel comprises a first connecting section which connects the first section with the second section of the guiding channel, wherein the base of the second section of the guiding channel is arranged within the second plane and oriented perpendicular to the first section. Moreover, the guiding channel comprises a second connecting section which connects the second section of the guiding channel to a third section of the guiding channel, a third connecting section which connects the third section of the guiding channel to a fourth section of the guiding channel and a fourth connecting section which connects the fourth section of the guiding channel to a final section of the guiding channel. It is possible that the fourth connecting section provides the final section. Each connecting section provides a 90° turn of the course of the guiding channel. It is possible that a base of the third section of the guiding channel is arranged within the first plane and/or a base of the fourth section of the guiding channel is arranged within the second plane.

In particular, it is possible that one turn of the electric line placed in the guiding channel which provides a part of a winding structure can have a rectangular shape with rounded corners, wherein lateral sections of the turn or winding structure are arranged within the first plane and longitudinal sections of the turn or winding structure are arranged within the second plane.

Preferably, the guiding channel provides multiple turns such that an electric line placed within the guiding channel provides a coil. The cable bearing element is designed such that each turn has a different distance to a common central axis of the cable bearing element. Thus, the end of e.g. the first turn of the guiding channel is displaced with respect to the beginning of the first turn, i.e. it is not connected to the beginning of the first turn.

In another embodiment, the first section of the guiding channel, in particular a centre or base line of the first section of the guiding channel extends perpendicular to the other section of the guiding channel, in particular a centre or base line of the other section of the guiding channel. With respect to an arrangement of the proposed cable bearing element within a receiving device of a vehicle, the first section of the guiding channel can extend in a lateral direction, wherein the other section of the guiding channel can extend in a longitudinal direction, wherein the longitudinal direction is equal to or parallel to a direction of travel of the vehicle if the vehicle drives straightforward. Thus, longitudinal sections of a winding structure provided by the electric line placed within the guiding channel can be arranged at a different height level than lateral sections of the winding structure. If a vertical direction is oriented perpendicular to a driving surface, in particular a flat driving surface, which defines a zero level of the vertical direction, the longitudinal sections can be arranged at a higher or lower height than the lateral sections. Thus, there is a free space underneath the longitudinal or lateral sections, e.g. between a bottom side of the vehicle and the longitudinal or lateral sections, wherein said free space can be used to arrange sections of other cable bearing elements or the aforementioned magnetic guiding elements for guiding a magnetic flux.

The orthogonal orientation of the first and the other section advantageously allows a simple set up of a winding structure providing a coil or a coil-like structure.

In another embodiment, the first section and the other section are connected via a connecting section, wherein the connecting section comprises a ramp-shaped section. The ramp-shaped section provides a transition from the first plane to the second plane. The ramp-shaped section can have a constant slope or gradient, wherein the gradient is defined with respect to the aforementioned vertical direction. It is also possible that the connecting section is staircase-shaped.

The connecting section can be an integral element of the cable bearing element. This advantageously allows providing the first section, the connecting section and the other section of the guiding channel by a one-piece element.

In a preferred embodiment, the ramp-shaped section is S-shaped. A radius of the curved sections of the S-shaped section can be equal or larger than a minimal bending radius of the electric line which is to be placed in the guiding channel. This advantageously allows a smooth transition from the first to the second plane wherein an optimal guidance of the electrical line is provided.

In another embodiment, the connecting section comprises a curved section. A base or base line of the curved section can be arranged or extend within the first or the second plane. The curved section can provide a 90° turn. The curved section can be arranged ahead or behind the ramp-shaped section of the connecting section. The terms "ahead" and "behind" are defined with respect to a course of the guiding channel, wherein, along the course of the guiding channel, the other section is arranged behind the first section.

The curved section advantageously allows a simple transition between the first and the other section of the guiding channel which are oriented perpendicular to each other.

In another embodiment, a first section of the first turn of the guiding channel extends parallel to a first section of a following turn of a guiding channel. A base of each of the first sections of the first turn and the following turn(s) can be arranged within the first plane. It is also possible that a second section of the first turn of the guiding channel can extend parallel to a second section of the following turn. In this case, it is possible that the bases of the second sections of each turn are arranged within the second plane. A distance of the different turns to the common central axis can increase or decrease from turn to turn.

This advantageously allows designing a coil by placing the electric line into the guiding channel of the proposed cable bearing element. Furthermore, a single turn of the electric line placed within the guiding channel can be differenced towards the next turn in such a way that there is a constant spacing between corresponding sections of each turn. This advantageously also allows distributing mechanical stress resulting from thermal expansion and for Lorentz forces caused by impulse voltages and currents through the winding.

The electric line to be placed in the proposed cable bearing element should contain required installation levels and provide enough space of separation such that an insulation between turns and other external conductive pathes is maximized.

In another embodiment, a number of turns is a non-integer number. In this case, the number of turns is not a whole number. This advantageously allows arranging a beginning or entry point of the guiding channel at a different location than an end or exit point of the guiding channel.

In another embodiment, the base of the guiding channel at an end of the guiding channel is arranged within the same plane as the base of the guiding channel at a beginning of the guiding channel. It is, for example, possible that the beginning of the guiding channel provides also a beginning of a first section of a first turn of the guiding channel. An end of the guiding channel can be arranged at an end of a first section of a second, third turn or any turn of the guiding channel.

This advantageously allows having a beginning or entry point of the guiding channel at the same height level as an end or exit point of the guiding channel but at different lateral or longitudinal positions. This, in turn, can increase an accessibility for electric connection of the electric line placed within the guiding channel.

In another embodiment, the length of the guiding channel is chosen such that the guiding channel provides a predetermined number of turns and the beginning of the guiding channel and the end of the guiding channel are arranged at opposite ends of corresponding sections of the first turn and the final turn of the guiding channel.

In this case, the beginning or entry point of the guiding channel is arranged at the same height level but with a large distance or offset from an end or exit point of the guiding channel, which improves an accessibility for an electric connection of the electric line placed within the guiding channel.

In another embodiment, the cable bearing element provides at least one fixing means for fixing or attaching the cable bearing element to a base structure. For example, the cable bearing element can provide additional flaps or extrusions with holes for screws or bolts. The additional flaps or extrusions can be arranged at an inner side wall of the cable bearing element, wherein the inner side wall is facing the aforementioned central axis.

This advantageously allows a simple fixation of the proposed cable bearing element while an accessibility of the fixing elements or fixing means is enhanced.

In another embodiment, the cable bearing element has at least one cable lug, wherein the cable lug is arranged at the beginning or the entry point of the guiding channel. The cable lug can extend in the vertical direction.

Another cable lug can be arranged at the end or exit point of the guiding channel or at an end of an integer-numbered turn of the guiding channel.

This allows a simple electrical connection of an electric line placed within the guiding channel and additionally provides a strain relief for the electric line.

In another embodiment, the cable bearing element is made of a thermoplastic material. This advantageously provides a cable bearing element with sufficient mechanical stability but a low weight. Preferably, the cable bearing element is made of a light material providing a desired strength and thermal properties. In this case a weight of a receiving device comprising the proposed cable bearing element can be reduced.

In another embodiment, the cable bearing element comprises two or more guiding channels which extend parallel to each other. The two or more guiding channels can be used to guide e.g. a double parallel litz cable. In this case, the number of turns relates to arrangement of the two or more parallel guiding channels.

This advantageously allows providing a desired shape of a winding structure, wherein the winding structure is formed by multi-core electric lines.

In another embodiment, the cable bearing element comprises a cover structure for covering the guiding channel, wherein the cover structure comprises means of guiding a fluid or flux convection. For example, the cover structure can comprise fluid channels. In this case, an electric line placed in the guiding channel of the proposed cable bearing element can be cooled by a fluid which flows through the guiding means of the cover structure. There can be a forced convection of a fluid, such as air, into and out of the cover structure. For instance, the injection or pumping of a fluid allows a cooling of the electric lines, in particular an external insulation of the electric lines as well as specific areas of the cable bearing element. This can make the cooling of such a winding structure more effective. It is, for example, possible to force cold air to the cable bearing element and to guide the hot air exhausted from the cable bearing element into a heat exchanger or cooling structure.

Furthermore, an arrangement of multiple cable bearing elements is proposed. The arrangement comprises a first cable bearing element according to the aforementioned explanations. The arrangement furthermore comprises the second cable bearing element according to the aforementioned explanations.

A base of a first section of the guiding channel of the first cable bearing element is arranged within the first plane and a base of another section of the guiding channel of the first cable bearing element is arranged within a second plane, wherein the second plane is parallel to the first plane and spaced apart from the first plane with a first predetermined distance. A base of a first section of a guiding channel of the second cable bearing element is arranged within the first plane and a base of another section of the guiding channel of the second cable bearing element is arranged within a third plane, wherein the third plane is parallel to the first plane and spaced apart from the first plane with a second predetermined distance which is different from the first predetermined distance. The second predetermined distance can be, for instance, higher or lower than the first predetermined distance.

This advantageously allows arranging at least a part of the other section of the second cable bearing element underneath or above the other section of the first cable bearing element. In this way, multiple cable bearing elements can be stacked together in order to form a multi-phase winding structure wherein each cable bearing element houses one phase line of the structure. It is also possible, that multiple cable bearing elements are stacked together and arranged in order to provide a multi-phase winding structure, wherein the electric line(s) of each phase are arranged such that each phase provides multiple, preferably three, coils which are located next to each other so as to form a sequence which covers an effective area in a plane that extends perpendicularly to the central axis of the coils. In particular, there can be a first and a second end coil at opposite ends of the sequence and at least one middle coil in between the end coils of the sequence. Moreover, it is possible that for at least one of the electric lines providing a phase, each of the end coils consists of a smaller number of turns than the middle coil or middle coils.

In another embodiment, the first and the second cable bearing element are arranged such that corresponding first sections of the guiding channels of the first and second cable bearing element extend parallel to each other and are spaced apart with a predetermined distance. The predetermined distance can be a longitudinal distance if the cable bearing elements are arranged within a receiving element of a vehicle. The distance is chosen such that a desired electrical phase shift, e.g. 60°, between phase currents carried by the electric lines placed in the guiding channels of the first and second cable bearing element during the inductive power transfer is provided. In this case, corresponding second sections of guiding channels of the first and second cable bearing element extend parallel to each other, wherein the second sections overlap at least partly.

In this case, a multi-phase winding structure with a desired electrical property, in particular property for inductive power transfer, can be provided if electric lines are placed within the guiding channels.

In another embodiment, the arrangement comprises multiple cable bearing elements with different numbers of guiding channels or turns. For instance, a cable bearing element providing one of the aforementioned middle section can have a higher number of turns than the cable bearing elements providing an end section. These cable bearing elements provide multiple coils of one single phase line if the cable bearing elements are arranged adjacent to each other, e.g. in the longitudinal direction.

Furthermore, a method of manufacturing a cable bearing element adapted position and/or to hold at least one line section of an electric line is proposed, wherein the cable bearing element provides at least one guiding channel for the section of the electric line.

A first section of the guiding channel is provided such that a base of a first section of the guiding channel is arranged within a first plane, another section of the guiding channel is provided such that a base of the other section of the guiding channel is arranged within a second plane, wherein the second plane is parallel to the first plane and spaced apart from the first plane with a first predetermined distance. The guiding channel comprises a base part and side walls, wherein a geometry or size of the guiding channel is adapted to the diameter of the electric line or cable which is to be arranged within the guiding channel.

This advantageously allows providing a cable bearing element which can house or provide a desired winding structure if the electric line is placed in the guiding channel.

BRIEF DESCRIPTION OF THE DRAWINGS

Examples of the invention will be described in the following with reference to the attached figures.

FIG. 8 shows a detailed end point of a guiding channel, FIG. 9 shows a top view of another cable bearing element.

DETAILED DESCRIPTION OF THE INVENTION

Figure 1:
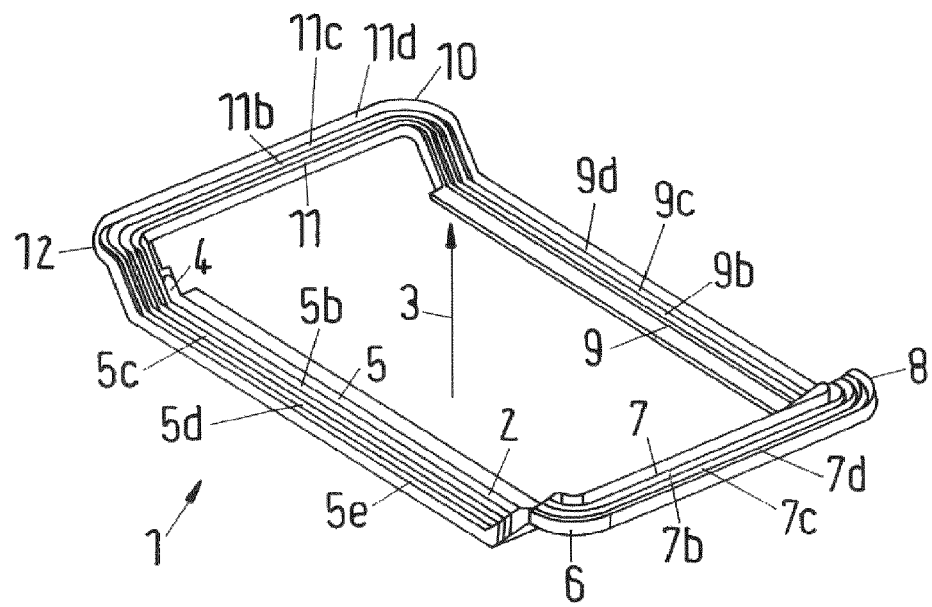
FIG. 1 shows a perspective view of a proposed cable bearing element.

FIG. 1 shows a perspective view of a cable bearing element 1. The cable bearing element 1 is made of a thermoplastic material. The cable bearing element 1 provides one guiding channel 2. The guiding channel 2 is U-shaped and it is shown that the guiding channel 2 provides a non-integer number of turns around a central axis 3 of the cable bearing element 1. An entry point 4 of the guiding channel 2 is arranged at the beginning of a first section 5 of the guiding channel 2. If a course of the guiding channel 2 is positive in a counter-clockwise orientation with respect to the central axis 3, a first connecting element 6 is arranged behind the first section 5. Following the first connecting section 6, a second section 7 of the guiding channel 2 is arranged. A base B5 of the first section 5 of the guiding channel 2 is arranged within a first plane P1 and a base of the second section 7 of the guiding channel 2 is arranged within a second plane P2, wherein the second plane P2 is parallel to the first plane P1 and spaced apart from the first plane P1 with a first predetermined distance D1 (see FIG. 3 and FIG. 4). Following the second section 7 of the guiding channel 2, a second connecting section 8 is arranged which connects the second section 7 to a third section 9 of the guiding channel 2. A base of the third section 9 of the guiding channel 2 is arranged within the first plane P1. Following the third section 9 of the guiding channel 2, a third connecting section 10 is arranged which connects the third section 9 to a fourth section 11 of the guiding channel 2. A base B11 of the fourth section 11 of the guiding channel 2 is arranged within the second plane P2 (see FIG. 5). Following the fourth section 11 of the guiding channel 2, a fourth connecting element 12 is arranged, which connects the fourth section 11 of the guiding channel 2 to a first section 5b of a second turn of the guiding channel 2. The first section 5, the second section 7, the third section 9 and the fourth section 11 denote sections 5, 7, 9, 11 of a first turn of the guiding channel 2. The second turn comprises a second section 7b, which corresponds to the second section 7 of the first turn, wherein a centre line of the second section 7b of the second turn is parallel to a centre line of the second section 7 of the first turn. However, a distance of the centre line 7b of the second turn to the central axis 3 is larger than a distance of the second section 7 of the first turn to the central axis 3. Correspondingly, the second turn comprises a third section 9b and a fourth section 11b. In FIG. 1, the shown cable bearing element 1 comprises four complete turns with sections 5c, 7c, 9c, 11c, 5d, 7d, 9d, 11d, and a first section 5e of a fifth turn.

Figure 2:
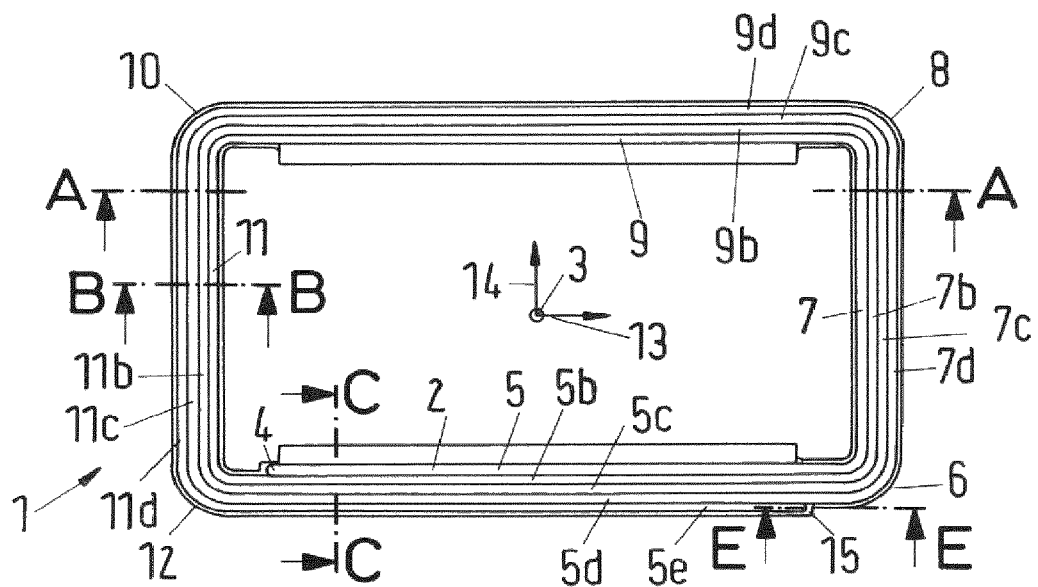
FIG. 2 shows a top view of the cable bearing element shown in FIG. 1.

In FIG. 2 a top view of the cable bearing element 1 shown in FIG. 1 is shown. It is shown that first sections 5, 5b, 5c, 5d of different turns of the guiding channels 2 extend perpendicular to second sections 7, 7b, 7c, 7d and fourth sections 11, 11b, 11c, 11d of different turns of the guiding channel 2. In FIG. 2, a lateral direction is shown by an arrow 13 and a longitudinal direction is shown by an arrow 14. If the cable bearing element 1 is integrated into a receiving device of a vehicle (not shown), the cable bearing element 1 will be arranged such that the longitudinal direction 14 is equal or parallel to a direction of travel if the vehicle travels straight forward. Thus, first sections 5, 5b, 5c, 5d, 5e and the third sections 9, 9b, 9c, 9d of the guiding channel 2 can be referred to as lateral sections, whereas the second sections 7, 7b, 7c, 7d and fourth sections 11, 11b, 11c, 11d of the guiding channel 2 can be referred to as longitudinal sections. An electric line (not shown) will be placed into the guiding channel 2, wherein the electric line will extend starting from the entry point 4 along the first section 5 of the first turn of the guiding channel 2 in the lateral direction. At the end of the first section 5 of the first turn, the electric line will be placed into the first connecting section 6, wherein the electric line will first ascend from the first plane P1 to the second plane P2 and then turn to the left by 90°. Then, the electric line will extend along the second section 7 of the first turn in the longitudinal direction and extend through the second connecting section 8, wherein the electric line will descend from the second plane P2 to the first plane P1 and turn left by 90° s. In this way, multiple turns of the electric line can be achieved providing a nearly flat coil structure. After an end of a fourth turn, the electric line will extend along the first section 5e of a fifth turn of the guiding channel 2, wherein at the end of the first section 5e an exit point 15 of the guiding channel 2 is arranged.

Figure 3:
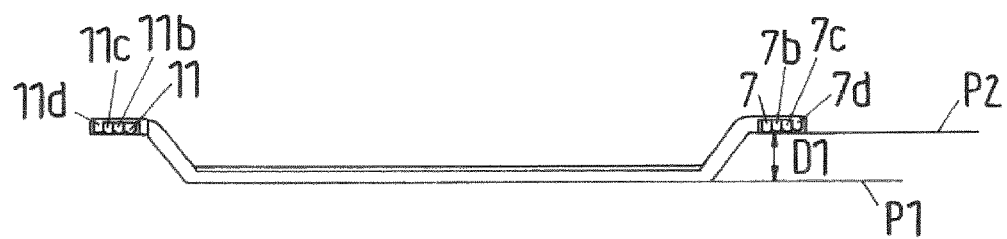
FIG. 3 shows a lateral cross section of the cable bearing element shown in FIG. 1.

FIG. 3 shows a lateral cross section marked by A-A in FIG. 2. In FIG. 3, the first distance D1 is shown which is the distance between the first plane P1 and the second plane P2.

Figure 4:
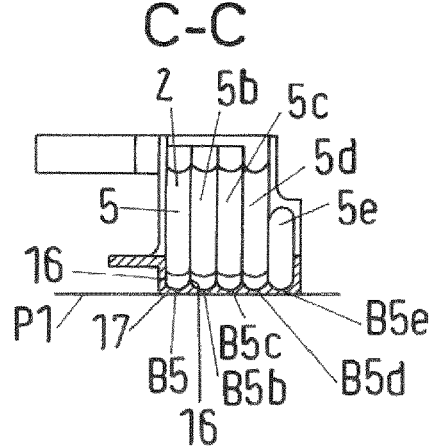
FIG. 4 shows a detailed cross section of a first section of guiding channels of the cable bearing element shown in FIG. 1.

In FIG. 4, a longitudinal cross section through the first sections 5, 5b, 5c, 5d, 5e which is marked by C-C in FIG. 2 is shown. Shown is also a base B5 of the first section 5 of the first turn. Correspondingly, bases B5b, B5c, B5d, B5e of the first sections 5b, 5c, 5d, 5e of the remaining turns are shown. It is shown that all bases B5, B5b, B5c, B5d, B5e are arranged within the first plane P1. Each section of the guiding channels 2 has side walls 16, which are exemplarily shown for the first section 5 of the first turn of the guiding channel 2. The guiding channel 2 also has a curved shaped bottom part 17 which comprises the base B5 which is also exemplarily shown only for the first section 5 of the first turn of the guiding channel 2.

Figure 5:
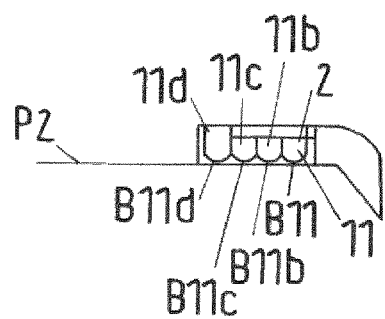
FIG. 5 shows a detailed cross section of second sections of guiding channels of the cable bearing element in FIG. 1.

In FIG. 5, a cross section (lateral cross section) through fourth sections 11, 11b, 11c, 11d of the guiding channels 2 is shown which is marked by B-B in FIG. 2. It is shown that the bases B11, B11b, B11c, B11d of each of the fourth sections 11, 11b, 11c, 11d of the guiding channel 2 are arranged within the second plane P2.

Figure 6:
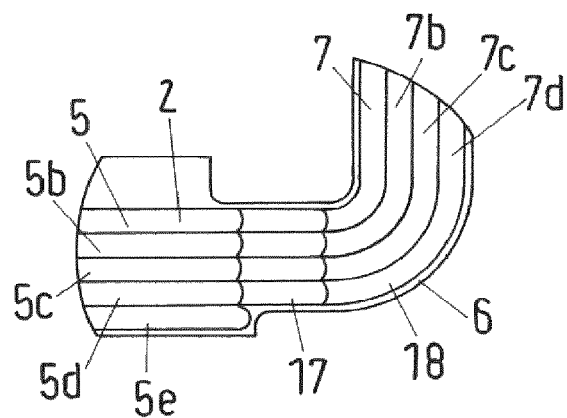
FIG. 6 shows a detailed top view of a connecting section.
Figure 7:
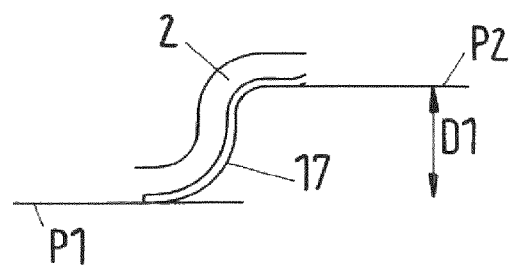
FIG. 7 shows a detailed cross section of a connecting section.

In FIG. 6, a detailed top view of the first connecting section 6 is shown. The connecting section 6 comprises a ramp-shaped section 17 and a curved section 18. The ramp-shaped section 17 is shown in more detail in FIG. 7. It is shown that in a positive direction of the course of the guiding channel 2, the ramp-shaped section 17 is arranged ahead of the curved section 18. This means that a basis or base line of the guiding channel 2 of the curved section 18 is arranged within the second plane P2 (see FIG. 3). The curved section 18 provides a 90° turn of the orientation of the guiding channel 2. A radius of curved sections of the ramp-shaped section 17 and a radius of the curved section 18 is equal to or larger than a minimal bending radius of an electric line to be placed into the guiding channel 2.

In FIG. 7a lateral cross section through a ramp-shaped section 17 is shown. The ramp-shaped section 17 is S-shaped. The S-shaped section begins at an end of the first section 5 of the first turn of the guiding channel 2 and ends at the beginning of the curved section 18 (see FIG. 6) of the first connecting section 6. The S-shaped section provides a transition from the first plane P1 to the second plane P2.

In FIG. 8, a lateral cross section through the first section 5e of the fifth turn of the guiding channel 2 at an exit point 15 of the guiding channel 2 is shown. It is shown that the exit point or exit segment 15 of the guiding channel 2 is provided by a curved course of the side wall 16 of the guiding channel 2. A radius of the curved section is equal or larger than a minimal bending radius of an electric line to be placed within the guiding channel 2.

In FIG. 9, another cable bearing element 1 is shown. In contrast to the cable bearing element 1 shown in FIG. 1, a guiding channel 2 of the cable bearing element 1 provides two complete turns and additionally extends along a first section 5c of a third turn of the guiding channel 2. Shown are also fixing flaps 19 with holes 20, wherein only one hole 20 is denoted by a reference numeral. The fixing flaps 19 are arranged at inner side walls of the first section 5 and the third section 9 of the guiding channel 2 of the first turn. Screws or bolts can be applied through the holes 20 in order to fix the cable bearing element to a supporting structure, e.g. a supporting structure of a receiving device of a vehicle.

Furthermore, cable lugs 21 are shown. These cable lugs 21 serve for a simpler electrical connection of an electric line placed in the guiding channel 2 and for a stress relief of the electric line.

Figure 10:
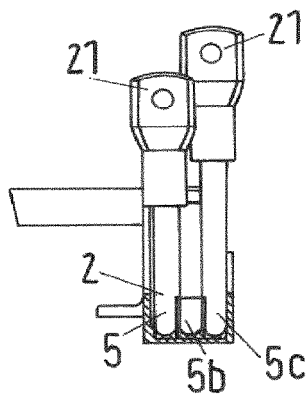
FIG. 10 shows a side view of cable lugs.

In FIG. 10, the cable lugs 21 are shown in more detail. It is shown that the cable lugs 21 extend in a vertical direction from the first sections 5, 5b, 5c of different turns of the guiding channel 2. A first cable lug 21 is assigned to the first section 5 of the first turn of the guiding channel 2. As seen in FIG. 9, the cable lug 21 is arranged at an entry point 4 of the guiding channel 2. This cable lug 21 serves to connect a beginning of an electric line placed in the guiding channel 2. A second cable lug 21 is assigned to the first section 5c of the final turn of the guiding channel 2. This cable lug 21 serves to connect an end of an electric line placed in the guiding channel 2.

Figure 11:
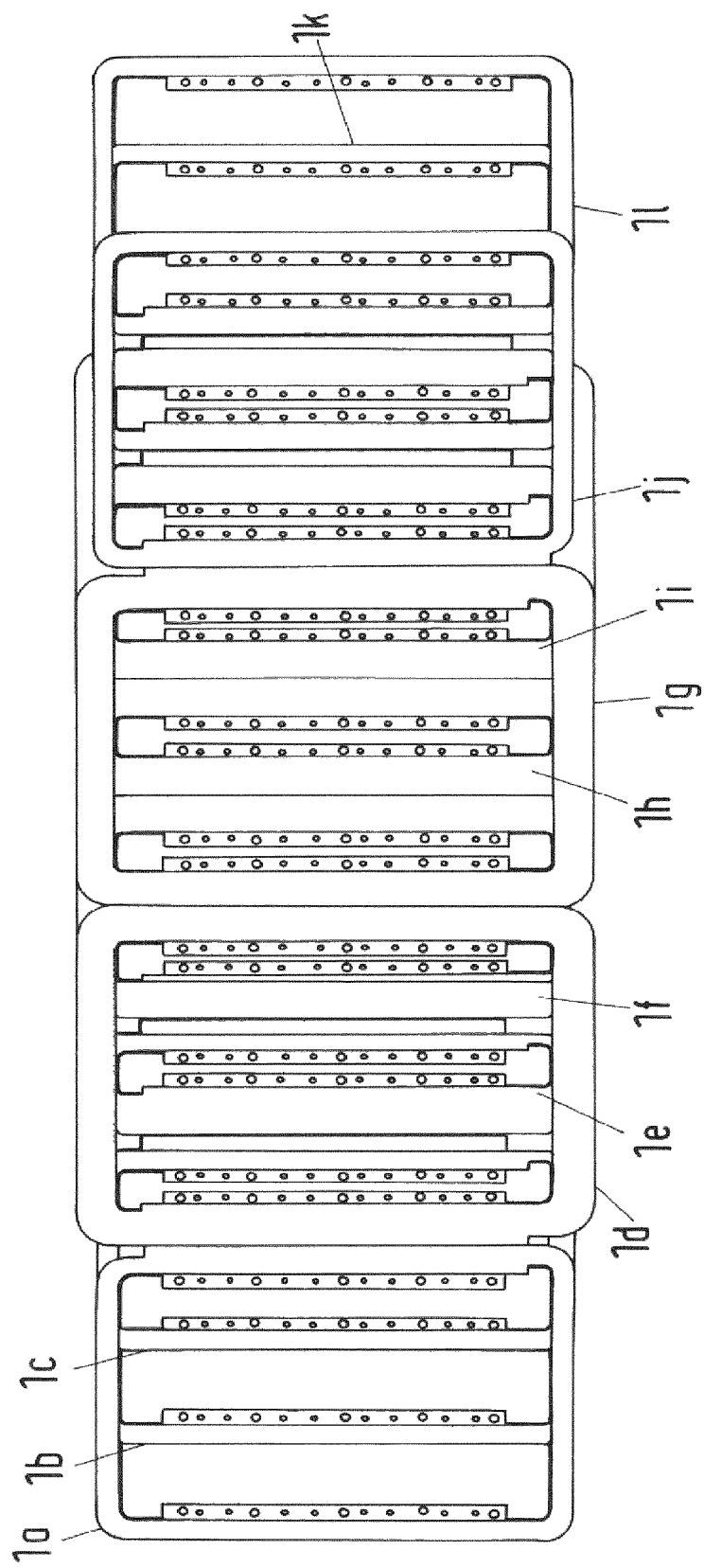

In FIG. 11, an arrangement of multiple cable bearing elements 1a, 1b, 1c, 1d, 1e, 1f, 1g, 1h, 1i, 1j, 1k, 1l is shown. The cable bearing elements 1a, 1d, 1g, 1j are designed and arranged such that an electric line providing a first phase of a secondary winding of a transformer for transferring electric energy to a receiving device of a vehicle inductively is formed. The first phase consists of four consecutive coils, wherein the first coil is provided by the electric line placed within the first cable bearing element 1a, the second coil is provided by the electric line placed in the guiding channel of the fourth cable bearing element 1d, the third coil is provided by the electric line placed in the guiding channel of the seventh cable bearing element 1g and the fourth coil is provided by the electric line placed in the guiding channel of the tenth cable bearing element 1j. Accordingly, a second and a third phase, each consisting of four consecutive coils, are provided by electric lines placed in the guiding channels of the cable bearing elements 1b, 1e, 1h, 1j (second phase) and the cable bearing elements 1c, 1f, 1i, 1l (third phase). In FIG. 11 it is shown that the cable bearing elements 1a, 1b, 1c providing the first coils of each phase and also the cable bearing elements 1j, 1k, 1l providing final coils of each phase each provide two turns. The cable bearing elements 1d, 1e, 1f, 1g, 1h, 1i providing middle coils of each phase each provide at least four turns of the guiding channel.

Figure 12:
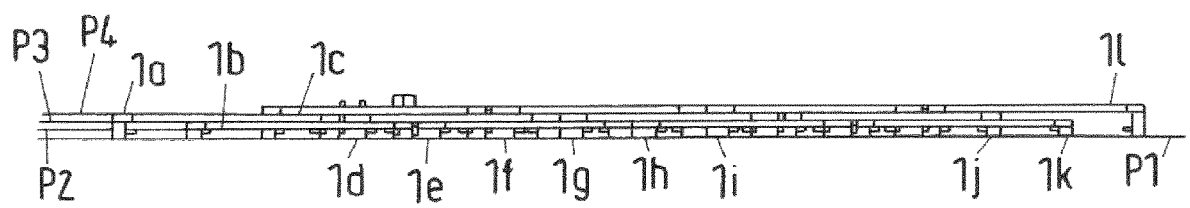
FIG. 11 shows a top view of an arrangement of multiple cable bearing elements and FIG. 12 shows a side view of the arrangement shown in FIG. 11.

In FIG. 12, a side view of the arrangement of cable bearing elements 1a, . . . , 1l shown in FIG. 11 is shown. It is shown that longitudinal sections of the different cable bearing elements 1a, . . . , 1l are arranged at different heights. In particular, bases of longitudinal sections of different cable bearing elements 1a, . . . , 1l can be arranged in a second plane P2, in a third plane P3 and a fourth plane P4 which are arranged parallel to each other and spaced apart at predetermined distances. Lateral sections of all cable bearing elements 1a, . . . , 1l are arranged in the first plane P1. Thus, it is possible to stack the cable bearing elements 1a, . . . , 1l together such that longitudinal sections of the different cable bearing elements 1a, . . . , 1l partly overlap. It is, for instance, shown that longitudinal section of the first cable bearing element 1a partly overlap longitudinal sections of the second cable bearing element 1b and the third cable bearing element 1c. In this way, a desired winding structure of a multi-phase secondary winding of a transformer for receiving an electromagnetic field during an inductive power transfer can be designed.

The cable bearing elements 1a, . . . , 1l allow a precise positioning of electric lines in order to provide a desired winding structure. In this way, an improved mechanical stability for the windings is provided. Lorentz forces can be distributed in the complete structure. The positioning of electric lines within the cable bearing elements 1a, . . . , 1l allows reducing the time of producing a desired winding structure. This, in turn, lowers the costs of an assembly process. Also, the proposed cable bearing element 1a, . . . , 1l provide an enhanced flexibility in repair and refurbish. Also the cable bearing element 1a, . . . , 1l can be designed such that the weight of each cable bearing element 1a, . . . , 1l is reduced. Also mechanical stress of the cable structure e.g. due to thermal expansion can be reduced.

The invention claimed is:

1. A cable bearing element adapted to position and/or to hold at least one line section of an electric line, the electric line forming a phase line of a receiving device of a vehicle, the vehicle adapted to receive an alternating electromagnetic field, the cable bearing element comprising:
- at least one guiding channel for the at least one line section of the electric line,
- wherein a base of a first section of the at least one guiding channel is arranged within a first plane and a base of a second section of the at least one guiding channel is arranged within a second plane, wherein the second plane is parallel to the first plane and spaced apart from the first plane with a first predetermined distance,
- wherein the at least one guiding channel is open at a top end and comprises a base part and side walls, wherein a geometry or size of the at least one guiding channel is adapted to accommodate a diameter of the electric line to be arranged within the at least one guiding channel,
- wherein the at least one guiding channel provides at least one complete 360° turn having a first complete 360° turn about a central axis of the cable bearing element,
- wherein the at least one guiding channel comprises the first section, the second section, a third section, and a fourth section,
- wherein the first section, the second section, the third section, and the fourth section provide the first complete 360° turn of the at least one guiding channel,
- wherein the base of the first section and a base of the third section are arranged in the first plane,
- wherein the base of the second section and a base of the fourth section are arranged in the second plane, a beginning of the first complete 360° turn of the at least one guiding channel and an end of the first complete 360° turn of the at least one guiding channel being radially offset from each other relative to the central axis, and
- wherein a first portion of a centreline of the at least one guiding channel at the end of the first complete 360° turn of the at least one guiding channel and a second portion of the centreline of the at least one guiding channel at the beginning of the first complete 360° turn of the at least one guiding channel extend parallel to each other and are spaced apart with a second predetermined distance.

2. The cable bearing element of claim 1, wherein the first section of the at least one guiding channel extends perpendicular to the second section of the at least one guiding channel.

3. The cable bearing element of claim 1, wherein the first section and the second section are connected via a connecting section, wherein the connecting section comprises a ramp-shaped section.

4. The cable bearing element of claim 3, wherein the ramp-shaped section is S-shaped.

5. The cable bearing element of claim 3, wherein the connecting section comprises a curved section.

6. The cable bearing element of claim 1, wherein a first section of the first complete 360° turn of the at least one guiding channel extends parallel to a first section of a second complete 360° turn of the at least one guiding channel about the central axis of the cable bearing element.

7. The cable bearing element of claim 1, wherein the at least one guiding channel further comprises at least one additional turn extending from the at least one complete 360° turn, and wherein the at least one additional turn includes a turn less than 360° about the central axis of the cable bearing element.

8. The cable bearing element of claim 1, wherein a length of the at least one guiding channel is chosen such that the at least one guiding channel provides a predetermined number of turns including the at least one complete 360° turn, and wherein a beginning of the at least one guiding channel and an end of the at least one guiding channel are arranged at opposite ends of corresponding sections of the first complete 360° turn and a final turn of the predetermined number of turns of the at least one guiding channel.

9. The cable bearing element according to claim 1, wherein the cable bearing element provides at least one fixing means.

10. The cable bearing element according to claim 1, wherein the cable bearing element has at least one cable lug, and wherein the at least one cable lug is arranged at the beginning of the first complete 360° turn of the at least one guiding channel.

11. The cable bearing element according to claim 1, wherein the cable bearing element is made of a thermoplastic material.

12. A method of manufacturing a cable bearing element adapted to position and/or to hold at least one line section of an electric line, the electric line forming a phase line of a receiving device of a vehicle, the vehicle adapted to receive an alternating electromagnetic field, the method comprising:
- providing the cable bearing element; and
- providing at least one guiding channel on the cable bearing element for the at least one line section of the electric line, wherein a first section of the at least one guiding channel is provided such that a base of the first section of the at least one guiding channel is arranged within a first plane,
- wherein a second section of the at least one guiding channel is provided such that a base of the second section of the at least one guiding channel is arranged within a second plane,
- wherein the second plane is parallel to the first plane and spaced apart from the first plane with a first predetermined distance,
- wherein the at least one guiding channel is open at a top end and comprises a base part and side walls, wherein a geometry or size of the at least one guiding channel is adapted to accommodate a diameter of the electric line to be arranged within the at least one guiding channel,
- wherein the at least one guiding channel provides at least one complete 360° turn having a first complete 360° turn about a central axis of the cable bearing element,
- wherein the at least one guiding channel comprises the first section, the second section, a third section, and a fourth section,
- wherein the first section, the second section, the third section, and the fourth section provide the first complete 360° turn of the at least one guiding channel,
- wherein the base of the first section and a base of the third section are arranged in the first plane,
- wherein the base of the second section and a base of the fourth section are arranged in the second plane, a beginning of the first complete 360° turn of the at least one guiding channel and an end of the first complete 360° turn of the at least one guiding channel being radially offset from each other relative to the central axis, and
- wherein a first portion of a centreline of the at least one guiding channel at the end of the first complete 360° turn of the at least one guiding channel and a second portion of the centreline of the at least one guiding channel at the beginning of the first complete 360° turn of the at least one guiding channel extend parallel to each other and are spaced apart with a second predetermined distance.

* * * * *